(12) United States Patent
Li

(10) Patent No.: US 9,813,398 B2
(45) Date of Patent: Nov. 7, 2017

(54) METHOD AND SYSTEM FOR INTERNET OF THINGS CAPABILITY INTEGRATION

(71) Applicant: ZTE CORPORATION, Shenzhen, Guangdong Province (CN)

(72) Inventor: Chunlei Li, Shenzhen (CN)

(73) Assignee: XI'AN ZHONGXING NEW SOFTWARE CO., LTD. (CN)

( * ) Notice: Subject to any disclaimer, the term of this patent is extended or adjusted under 35 U.S.C. 154(b) by 24 days.

(21) Appl. No.: 14/406,381

(22) PCT Filed: Dec. 26, 2012

(86) PCT No.: PCT/CN2012/087550
§ 371 (c)(1),
(2) Date: Dec. 8, 2014

(87) PCT Pub. No.: WO2013/181918
PCT Pub. Date: Dec. 12, 2013

(65) Prior Publication Data
US 2015/0143462 A1    May 21, 2015

(30) Foreign Application Priority Data
Jun. 7, 2012   (CN) .......................... 2012 1 0185789

(51) Int. Cl.
*H04L 29/06* (2006.01)
*H04W 4/00* (2009.01)
(Continued)

(52) U.S. Cl.
CPC ............. *H04L 63/08* (2013.01); *G06Q 10/00* (2013.01); *H04L 47/2425* (2013.01);
(Continued)

(58) Field of Classification Search
CPC combination set(s) only.
See application file for complete search history.

(56) References Cited

U.S. PATENT DOCUMENTS

2002/0107664 A1* 8/2002 Pelz .................... G05B 19/0426
702/182
2004/0117802 A1* 6/2004 Green ................. G06F 11/3006
719/318
(Continued)

FOREIGN PATENT DOCUMENTS

| CN | 102137069 A | 7/2011 |
|---|---|---|
| CN | 102281584 A | 12/2011 |
| CN | 102378177 A | 3/2012 |

OTHER PUBLICATIONS

Office Action dated Jan. 3, 2017 for Chinese Patent Application No. 201210185789.3.

*Primary Examiner* — Taghi Arani
*Assistant Examiner* — Phy Anh Vu
(74) *Attorney, Agent, or Firm* — Plumsea Law Group, LLC

(57) ABSTRACT

Disclosed is an Internet of things capability integration system, which relates to the field of Internet of things, and the field of telecommunication network and Internet. The disclosed Internet of things capability integration system includes: an Internet of things capability integration access platform, configured to be accessed by Internet of things capability devices, authenticate the accessed Internet of things capability devices, develop Internet of things capability services based on the accessed Internet of things capability devices, and load the developed Internet of things capability services; an Internet of things capability operation management platform, configured to perform an operation management operation on the Internet of things capability services developed and loaded by the Internet of things capability integration access platform; and an Internet of things capability opening management platform, configured to open the Internet of things network capability services developed and loaded by the Internet of things capability (Continued)

integration access platform, and perform an management operation on the opening of the Internet of things capability services. An Internet of things capability integration method is also disclosed. The present technical schemes sufficiently exert the operation capability and resources of operators, and cover the shortage of the current Internet of things industry development.

12 Claims, 6 Drawing Sheets

(51) Int. Cl.
*H04L 12/851* (2013.01)
*G06Q 10/00* (2012.01)
*H04L 29/08* (2006.01)

(52) U.S. Cl.
CPC ............. *H04L 67/02* (2013.01); *H04W 4/005* (2013.01); *H04L 67/12* (2013.01)

(56) References Cited

U.S. PATENT DOCUMENTS

| | | | | |
|---|---|---|---|---|
| 2004/0247131 A1* | 12/2004 | Buer | ................... | G06Q 20/3674 380/278 |
| 2005/0097367 A1* | 5/2005 | Nakazawa | ........ | H04L 29/06027 726/4 |
| 2005/0182931 A1* | 8/2005 | Robert | .................... | G06F 21/10 713/168 |
| 2006/0033840 A1* | 2/2006 | Diehl | .................... | H04N 7/163 348/468 |
| 2007/0107065 A1* | 5/2007 | Asaumi | ............... | H04L 63/0823 726/28 |
| 2008/0089516 A1* | 4/2008 | Cocchi | ................... | H04N 5/913 380/200 |
| 2008/0184345 A1* | 7/2008 | Kaechi | .................. | H04L 63/107 726/5 |
| 2008/0219239 A1* | 9/2008 | Bell | ..................... | H04L 12/4625 370/351 |
| 2010/0106860 A1* | 4/2010 | Li | ....................... | H04L 12/2834 709/250 |
| 2010/0106960 A1 | 4/2010 | Kudo et al. | | |
| 2012/0113992 A1* | 5/2012 | Zhao | ..................... | H04W 4/005 370/431 |
| 2012/0290872 A1* | 11/2012 | He | ....................... | H04W 4/005 714/4.11 |
| 2014/0289366 A1* | 9/2014 | Choi | .................... | G06F 9/4451 709/218 |
| 2015/0019710 A1* | 1/2015 | Shaashua | ........... | G06F 17/30705 709/224 |
| 2015/0195149 A1* | 7/2015 | Vasseur | ............... | H04L 41/5009 370/252 |
| 2015/0281002 A1* | 10/2015 | Xu | .......................... | H04L 67/12 709/223 |

* cited by examiner

METHOD AND SYSTEM FOR INTERNET OF THINGS CAPABILITY INTEGRATION

CROSS-REFERENCE TO RELATED APPLICATION(S)

This application is the U.S. National Phase application of PCT application number PCT/CN2012/087550 having a PCT filing date of Dec. 26, 2012, which claims priority of Chinese patent application 201210185789.3 filed on Jun. 7, 2012, the disclosures of which are hereby incorporated by reference.

TECHNICAL FIELD

The present document relates to the field of the Internet of things, and the field of telecommunication network and Internet. In particular, the document relates to integrating related capabilities of the Internet of things into a conventional telecommunication system through media such as the Internet, a telecommunication network etc., and performing opening of the Internet of things capabilities through an operation channel of the telecommunication network.

BACKGROUND OF THE RELATED ART

Since the online coke selling machine from the Xerox Corporation is started in 1990, the concept of "the Internet of things" has been gradually concerned by people.

As the name implies, "the Internet of things is exactly the Internet that links things to each other". This has two-layer meanings: first, the core and the basis of the Internet of things are still the Internet, and is a network extended and expanded on basis of the Internet; and second, its clients are extended and expanded between any things, for information exchange and communication. That is, the Internet of things is an information carrier based on the Internet, the conventional telecommunication network etc., to achieve all general physical objects which can be addressed independently as an interworking network.

The Internet of things will be the next "important productivity" which promotes the high-speed development in the world! This common understanding is unquestionable. The Internet of things has become a focus direction of research and development in the world nowadays. The United States' authoritative advisory organization FORRESTER predicts that, by 2020, as compared with inter-people communication services, the Internet of things services in the world will reach 30 to 1. Therefore, "the Internet of things" is known as next tera-scale communication services.

Although at present the Internet of things technique has obtained breakthrough development and application in some fields or some key technological aspects, it has not been popularized, lacks large-scale operations, has capability development which is not deep enough, and has relatively single kinds of products, and has application and development which are also restricted by many factors. In particular, how to combine the market with the development of the Internet of things industry, how to pull and prompt diversified development of the Internet of things services and Internet of things capabilities by the market demands, and how to further guide and prompt the development of the Internet of things industry have become the subjects which are badly needed to be discussed and researched at present.

From the analysis of China's Internet of things industrial chain, it is anticipated that the future market leader will be telecommunication operators, and special Internet of things operators may appear with the refinement of division and the specialization, step-down and spread of operations. The operator will form a connecting link in whole industrial chain, to connect resources of various links in series, make the resources to play a maximal effect, and finally realize upgrade and improvement of the whole industry, create benefit and profit, and really form an Internet of things industry which has high profit and high added value and operates efficiently.

SUMMARY OF THE INVENTION

The purpose of the embodiments of the present document provides an Internet of things capability integration method and system, to overcome the bottleneck problem in the current Internet of things operation technologies.

In order to achieve the above purpose, the embodiments of the present document disclose an Internet of things capability integration system, comprising an Internet of things capability integration access platform, an Internet of things capability operation management platform, and an Internet of things capability opening management platform, wherein, the Internet of things capability integration access platform is configured to be accessed by Internet of things capability devices, authenticate the accessed Internet of things capability devices, and develop Internet of things capability services and load the developed Internet of things capability services based on the accessed Internet of things capability devices;

the Internet of things capability operation management platform is configured to perform an operation management operation on the Internet of things capability services developed and loaded by the Internet of things capability integration access platform; and the Internet of things capability opening management platform is configured to open the Internet of things network capability services developed and loaded by the Internet of things capability integration access platform, and perform a management operation on the opening of the Internet of things capability services.

In the above system, the Internet of things capability integration access platform comprises a capability access module and a capability service development module, wherein, the capability access module is configured to access the Internet of things capability devices, and perform authentication, management, and safety functional operations on the accessed Internet of things capability devices; and the capability service development module is configured to develop the Internet of things capability services based on atomic capabilities provided by operators and the accessed Internet of things capability devices, wherein, the development of the Internet of things capability services at least comprises one or more of:

atomic capability development, service arrangement, service test, service deployment, and service execution.

In the above system, the capability access module is configured to identify addresses of physical devices using gateway exchange between various network levels, to complete physical layer access of the Internet of things capability devices, and acquire information of the accessed Internet of things capability devices using one or more of the following networks, and perform authentication, management, and safety functional operations on the accessed Internet of things capability devices according to the acquired information of the Internet of things capability devices:

a Transmission Control Protocol/Internet Protocol (TCP/IP) core network, an internet, a wireless communication network, and other Internets of things with private media.

In the above system, the operation management operation performed by the Internet of things capability operation management platform at least comprises authentication and accounting.

In the above system, the Internet of things capability operation management platform comprises a unified operation portal module, a management unit, an accounting module, a statistic module, and a service execution module, wherein, the unified operation portal module is configured to provide a manager operated WEB interface to device providers, capability providers, capability service developers, terminal users, and operator managers;

the management unit is configured to mange contents related to Internet of things services and Internet of things and conventional telecommunication convergent services, manage portals of the Internet of things services and Internet of things and telecommunication convergent services, manage schemes of pricing and accounting policies and preferential policies related to the Internet of things services, and manage an ordering life cycle related to the Internet of things services;

the accounting module is configured to perform rating and accounting on the Internet of things services after the Internet of things services are used and ordered;

the statistic module is configured to analyze operation information and generate an operation report or a settlement statement; and the service execution module is configured to operate the Internet of things capability services developed by the Internet of things capability integration access platform and invoke the conventional telecommunication capabilities.

In the above system, the management operation performed by the Internet of things capability opening management platform on the opening of the Internet of things capability services at least comprises authentication, flow control, and Service Level Agreement (SLA) control.

In the above system, the Internet of things capability opening management platform at least comprises a capability opening module, an authentication module, a flow control module, and an SLA management module, wherein, the capability opening module is configured to provide a unified capability opening interface, to open the Internet of things capability services to a third party;

the authentication module is configured to perform authentication and link maintenance on the access in the process of opening the capabilities;

the flow control module is configured to perform flow monitoring and load balancing in the process of opening the capabilities; and the SLA management module is configured to perform service policies in the process of opening the capabilities.

The embodiments of the present document further disclose an Internet of things capability integration method, comprising:

having Internet of things capability devices access to an Internet of things capability integration system, authenticating, by the Internet of things capability integration system, the accessed Internet of things capability devices, and developing Internet of things capability services and loading the developed Internet of things capability services based on the accessed Internet of things capability devices; and performing, by the Internet of things capability integration system, an operation management operation on the Internet of things capability services which are developed and loaded while opening the Internet of things network capability services which are developed and loaded, opening the Internet of things network capability services and performing a management operation on the opening of the Internet of things capability services.

In the above method, the process of having Internet of things capability devices access to an Internet of things capability integration system, and authenticating, by the Internet of things capability integration system, the accessed Internet of things capability devices comprises:

identifying addresses of physical devices using gateway exchange between various network levels, to complete physical layer access of the Internet of things capability devices, and acquiring information of the accessed Internet of things capability devices using one or more of the following networks, and performing authentication, management, and safety functional operations on the accessed Internet of things capability devices according to the acquired information of the Internet of things capability devices:

a Transmission Control Protocol/Internet Protocol (TCP/IP) core network, an Internet, a wireless communication network, and other Internets of things with private media.

In the above method, the process of developing, by the Internet of thins capability integration system, Internet of things capability services and loading the developed Internet of things capability services based on the accessed Internet of things capability devices comprises:

developing the Internet of things capability services based on atomic capabilities provided by operators and the accessed Internet of things capability devices, wherein, the development of the Internet of things capability services at least comprises one or more of:

atomic capability development, service arrangement, service test, service deployment, and service execution.

In the above method, the operation management operation performed by the Internet of things capability integration system on the Internet of things capability services which are developed and loaded at least comprises authentication and accounting.

In the above method, the management operation performed by the Internet of things capability integration system on the opening of the Internet of things capability services which are developed and loaded at least comprises authentication, flow control, and Service Level Agreement (SLA) control.

The technical schemes of the present document overcome the shortage of the current Internet of things operation technologies, integrate the Internet of things capabilities into the operation system of the Internet (such as telecommunication) operators, and achieve opening of the capabilities by means of operation channels. The schemes sufficiently exert the operation capabilities and resources of operators, to enable them to achieve more effects and create larger values in the Internet of things industrial chain, cover the shortage of the current Internet of things industry development, and further prompt the development of the Internet of things industry.

PREFERRED EMBODIMENTS OF THE INVENTION

In order to make the purpose, technical schemes, and advantages of the present document more clear and obvious, the technical schemes of the present document will be described in detail below in conjunction with accompanying drawings. It should be illustrated that without conflict, the embodiments in the present application and the features in the embodiments could be combined with each other randomly.

Embodiment One

With the respect to the problems and bottlenecks of the development of the current Internet of things, in order to overcome the shortage of the current Internet of things operation technologies, the inventor provides an end-to-end solution in the terms of Internet of things capability integration and opening for integrating the Internet of things capabilities into the operation system of the communication (for example, telecommunication) operators and opening the capabilities through communication operation channels. Thereby, the operation capability and resources of operators are sufficiently exerted, to enable them to achieve more effects and create larger values in the Internet of things industrial chain, the shortage of the current Internet of things industry development is covered, and the development of Internet of things industry is further prompted. Therefore, the inventor provides an Internet of things capability integration system. The system can provide to a customer, services such as unified terminal device authentication, terminal access control, accounting, terminal management, industrial application management, service operation management, platform management etc., and can also provide a bridge for opening capabilities and a platform for integrating services to capability providers, thereby providing a better condition of making full use of communication media execution capabilities of operators and developing Internet of tings services by customer clusters. Thereby, the types of capabilities and the forms of services of the Internet of things will be further richen, thus people's life can also be further improved, and the operators can also create bigger development space and profit in the blue ocean of the Internet of things.

Figure 1:
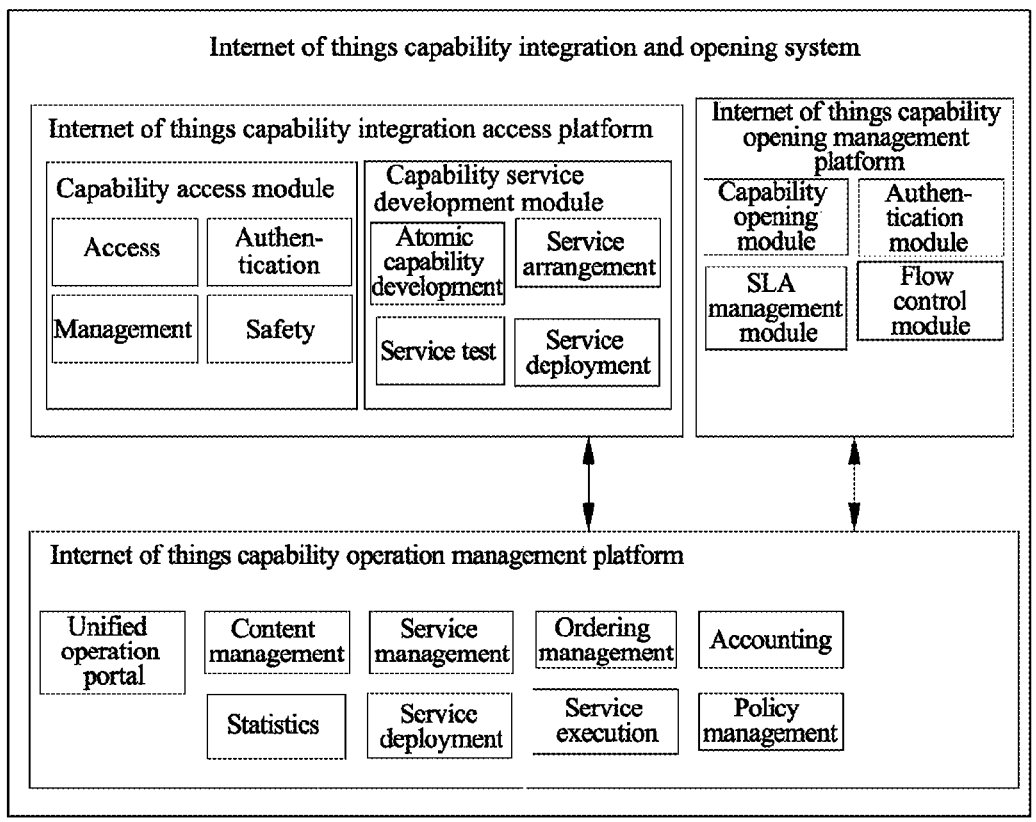
FIG. 1 is a diagram of a logic structure of an Internet of things capability integration and opening system according to an embodiment of the present document.

Specifically, the Internet of things capability integration system provided by the present embodiment, as shown in FIG. 1, comprises at least three primary parts, i.e., an Internet of things capability integration access platform, an Internet of things capability operation management platform, and an Internet of things capability opening management platform. Functions of various parts will be described below.

The Internet of things capability integration access platform is responsible for being accessed by Internet of things capability devices, performing operations such as authentication etc. on the accessed Internet of things capability devices, and performing functions such as development of Internet of things capability services and loading of the Internet of things capability services etc. based on the accessed Internet of things capability devices.

The Internet of things capability integration access platform can not only provide access and integration to public Internet of things capabilities, but also can provide integration to private Internet of things capabilities. The Internet of things capability operation management platform is responsible for performing an operation management operation (operations such as authentication, accounting etc.) on the Internet of things capability services developed and loaded by the above Internet of things capability integration access platform. At the same time, the Internet of things capability operation management platform may further combine the Internet of things capabilities with conventional telecommunication capabilities, and improve the Internet of things services by means of conventional capabilities.

The Internet of things capability opening management platform is responsible for opening the Internet of things capability services developed and loaded by the above Internet of things capability integration access platform, and performing a management operation on the opening of the Internet of things capability services. The management operation includes operations such as authentication, flow control, Service-Level Agreement (SLA) control etc. Wherein, the objects to which the Internet of things capability services are opened may be developers of capability services, or may also be personal users.

There is a communication interface between the above Internet of things capability integration access platform and the Internet of things capability operation management platform, which can complete information synchronization of service attribute data from the Internet of things capability integration access platform to the Internet of things capability operation management platform, and information synchronization to the Internet of things capability integration access platform when services are checked and the life cycle is managed by the Internet of things capability operation management platform. There is a communication interface between the above Internet of things capability opening management platform and the Internet of things capability operation management platform, which is used to complete synchronization of information such as service data, SLA policy data etc. from the Internet of things capability operation management platform to the Internet of things capability opening management platform.

Based on the above system architecture, in the present embodiment, it is proposed that the Internet of things capability integration access platform may also be divided into a capability access module and a capability service development module.

The capability access module is responsible for performing access, authentication, management, and safety functional operations on the Internet of things capability devices.

Specifically, a network which is contacted directly by the capability access module is a TCP/IP based core network, and a network which is contacted indirectly by the capability access module is an Internet, a wireless communication network, or other Internets of things with private media. This module primarily identifies addresses of physical devices (for example, identifies the addresses of the physical devices using IPv6/IPv4) using gateway exchange between various network levels, to complete physical layer access of the Internet of things capability devices, and has the premise of real-time communication and function control through a telecommunication network. That is, the capability access module communicates with one or more of the following networks to acquire information of the accessed Internet of things capability devices, so as to perform authentication, management, and safety functional operations:

a TCP/IP core network, an Internet, a wireless communication network, and other Internets of things with private media.

The capability service development module is responsible for developing services based on atomic capabilities provided by operators and the accessed Internet of things capability devices, wherein, the specific development process relates to one or more of the following:

atomic capability development, service arrangement, service test, service deployment, and service execution.

Wherein, the atomic capability development may be completed by operators or device providers.

Three sub-processes, i.e., service arrangement, service test, and service deployment may be completed by a service developer, or may also be completed by a normal user, since the Internet of things capability integration access platform provides an online, visual and wizard service development environment.

The sub-process, i.e., service execution, is an activity to perform in an operation stage, which further relates to operation cooperation between the Internet of things capability operation management platform and the Internet of things capability opening management platform. The detailed contents thereof can be known with reference to the following description.

It should also be illustrated that in a preferable scheme, except for basing on the atomic capabilities provided by operators and the accessed Internet of things capability devices, the Internet capabilities (for example, telecommunication capabilities) may also be combined to develop the Internet of things capability services.

The above Internet of things capability operation management platform will be described below. In the present embodiment, the Internet of things capability operation management platform may be divided into a unified operation portal module, a management unit, an accounting module, a statistic module, and a service execution module. The management unit may also be divided into a content management module, a service management module, a policy management module, and an ordering management module.

Wherein, the unified operation portal module provides a manger operated WEB interface to device providers, capability providers, capability service developers, terminal users, and operator managers.

The content management module in the management unit manages contents related to Internet of things services and Internet of things and conventional telecommunication convergent services;

the service management module in the management unit manages portals of the Internet of things services and Internet of things and telecommunication convergent services;

the policy management module in the management unit manages schemes of pricing and accounting policies and preferential policies related to the Internet of things services; and the ordering management module in the management unit manages manage an ordering life cycle related to the Internet of things services.

The accounting module performs rating and accounting on the Internet of things services after the services are used and ordered.

the statistic module analyzes operation information and form an operation report or a settlement statement the service execution module operates the Internet of things capability services developed by the Internet of things capability integration access platform and invokes the conventional telecommunication capabilities.

In the present embodiment, the above Internet of things capability opening management platform may be divided into a capability opening module, an authentication module, a flow control module, and an SLA management module.

Wherein, the capability opening module primarily provides a unified capability opening interface (such as ParlyX), to open the Internet of things capability services to a third party;

the authentication module performs functional operations such as authentication, link maintenance etc. on the access in the process of opening the capabilities;

the flow control module performs functional operations such as flow monitoring and load balancing etc. in the process of opening the capabilities; and the SLA management module performs service policies in the process of opening the capabilities.

Figure 2:
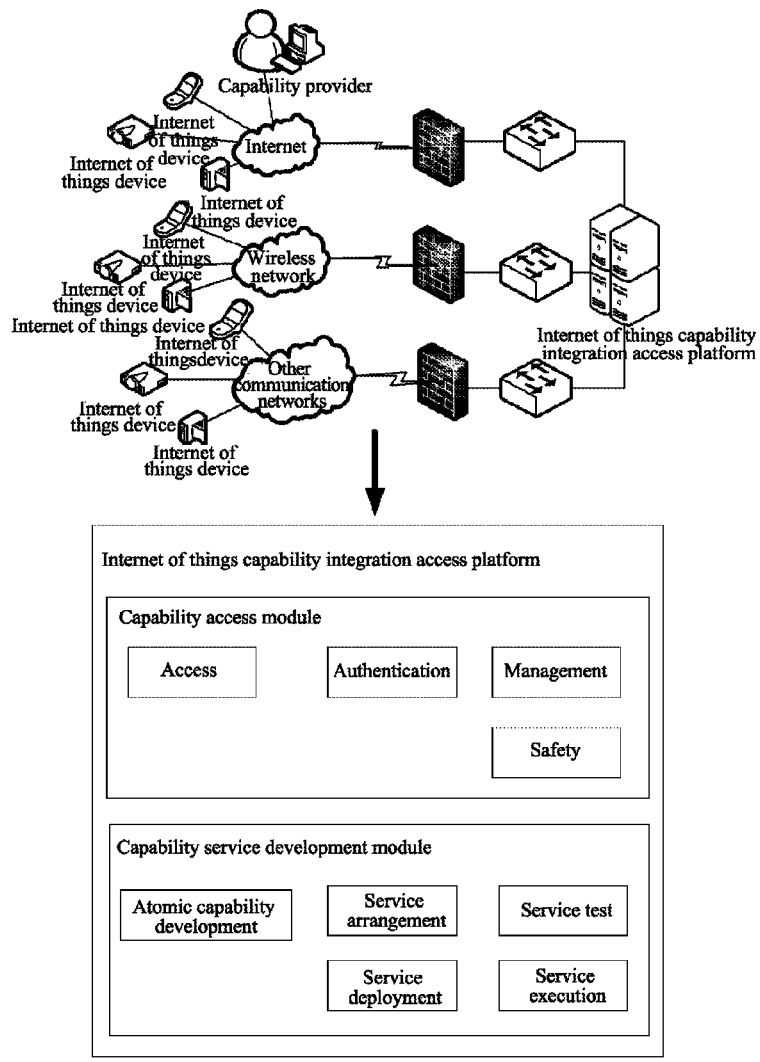
FIG. 2 is a diagram of architecture of an Internet of things capability integration access platform according to an embodiment of the present document.

In some other preferable schemes, the architecture of the Internet of things integration access platform is as shown in FIG. 2, which accesses the Internet of things, a wireless network, or other communication networks through core network switches and firewalls. The Internet of things capability integration access platform is further interconnected to various Internet of things devices through the above network, to complete integration of Internet of things device capabilities. Wherein, the capability providers log in the capability service development module of the Internet of things capability integration access platform through the internet in a WEB manner, for development of the Internet of things capabilities and services.

Figure 3:
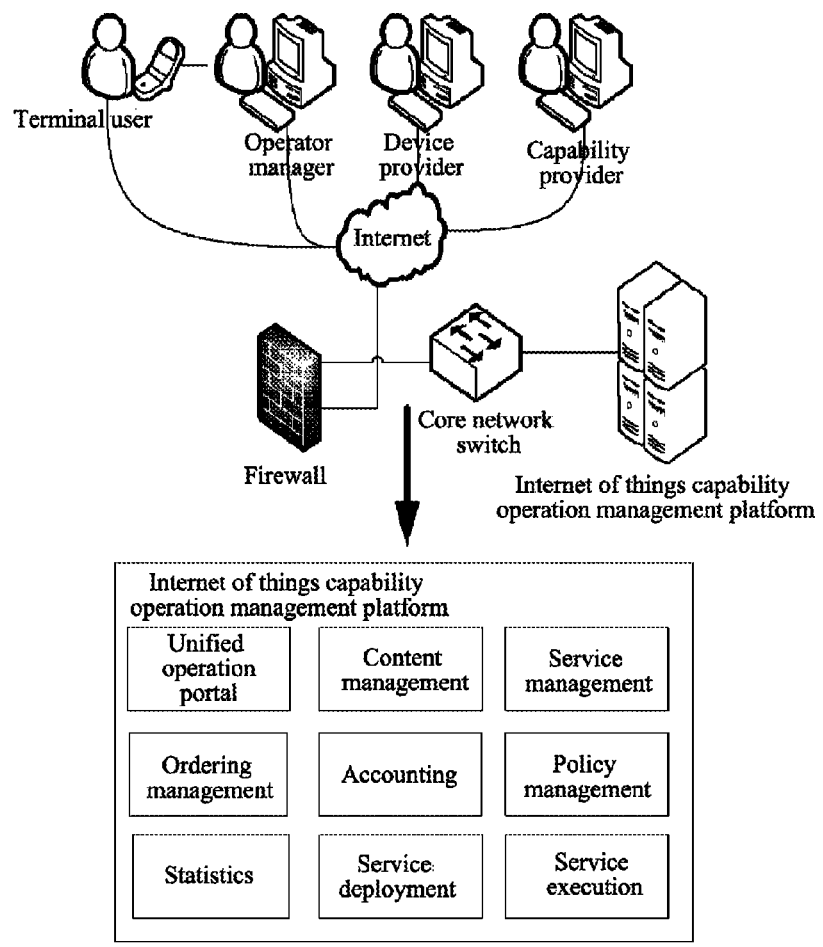
FIG. 3 is a diagram of architecture of an Internet of things capability operation management platform according to an embodiment of the present document.

The architecture of the Internet of things capability operation management platform is as shown in FIG. 3, which accesses the Internet through the core network switches and firewalls, to provide operation management services to terminal users, operator managers, device providers, and capability providers; and the related Internet of things capability operation management platform further provides functions performed by services.

Figure 4:
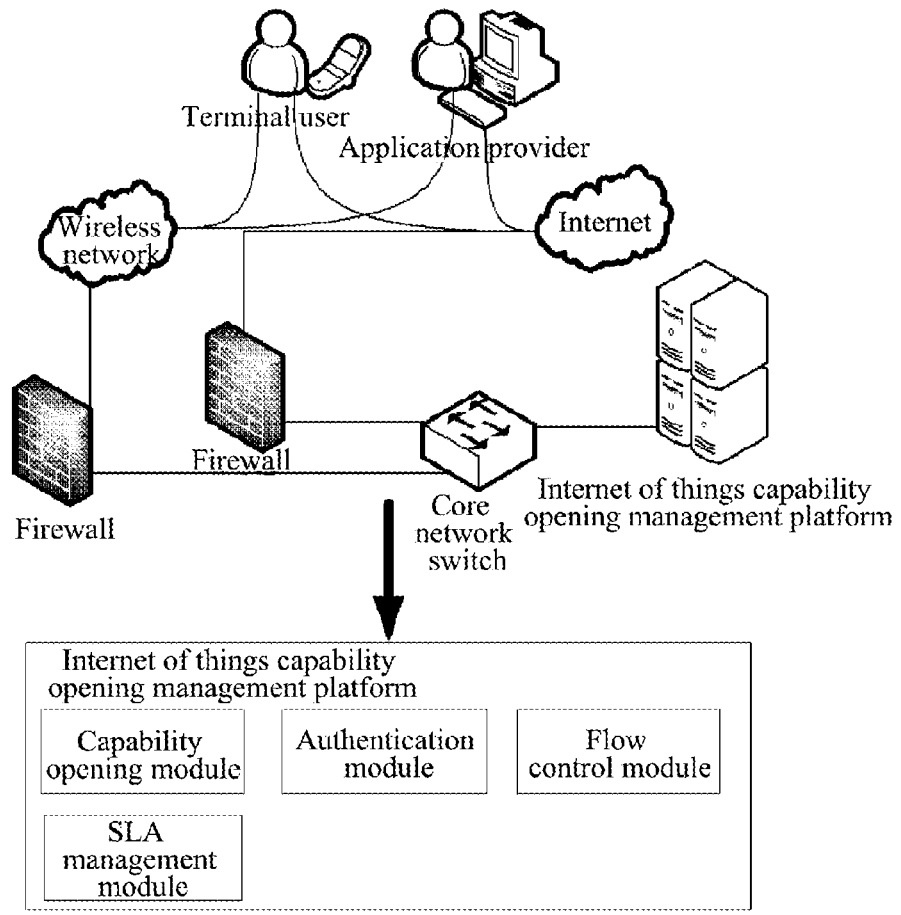
FIG. 4 is a diagram of architecture of an Internet of things capability opening management platform according to an embodiment of the present document.

The architecture of the Internet of things capability opening management platform is as shown in FIG. 4, which accesses the Internet and the wireless network through the core network switches and firewalls, to provide capability opening management services to the terminal users and application providers.

Embodiment Two

The present embodiment describes an Internet of things capability integration method, which is proposed based on the system in the above embodiment one. Specifically, the process of implementing the Internet of things capability integration method comprises:

having Internet of things capability devices access to an Internet of things capability integration system, authenticating, by the Internet of things capability integration system, the accessed Internet of things capability devices, and developing Internet of things capability services and loading the developed Internet of things capability services based on the accessed Internet of things capability devices; and performing, by the Internet of things capability integration system, an operation management operation on the Internet of things capability services which are developed and loaded while opening the Internet of things network capability services which are developed and loaded, opening the Internet of things network capability services and performing a corresponding management operation on the opening of the Internet of things capability services.

In the above process of implementing the method, the specific process of having Internet of things capability devices access to an Internet of things capability integration system, and authenticating the accessed Internet of things capability devices comprises:

identifying addresses of physical devices using gateway exchange between various network levels, to complete physical layer access of the Internet of things capability devices, and acquiring information of the accessed Internet of things capability devices using one or more of the following networks, and performing authentication, management, and safety functional operations on the accessed Internet of things capability devices according to the acquired information of the Internet of things capability devices:

a TCP/IP core network, an Internet, a wireless communication network, and other Internets of things with private media.

The specific process of developing, by the Internet of thins capability integration system, Internet of things capability services and loading the developed Internet of things capability services based on the accessed Internet of things capability devices comprises:

developing the Internet of things capability services based on atomic capabilities provided by operators and the accessed Internet of things capability devices, wherein, the development of the Internet of things capability services at least comprises one or more of:

atomic capability development, service arrangement, service test, service deployment, and service execution.

It should also be illustrated that the operation management operation performed by the above Internet of things capability integration system on the Internet of things capability services which are developed and loaded at least comprises authentication and accounting. Specifically, the operation management operation performed by the Internet of things capability integration system on the Internet of things capability services which are developed and loaded may be known with reference to the description in the above embodiment one, and will not be described here.

The corresponding management operation performed by the Internet of things capability integration system on the opening of the Internet of things capability services which are developed and loaded at least comprises authentication, flow control, and SLA control. Specifically, the corresponding management operation performed by the Internet of things capability integration system on the opening of the Internet of things capability services which are developed and loaded may be known with reference to the description in the above embodiment one, and will not be described here.

The above process of integration of Internet of things capabilities will be described below in conjunction with specific application scenarios.

Figure 5:
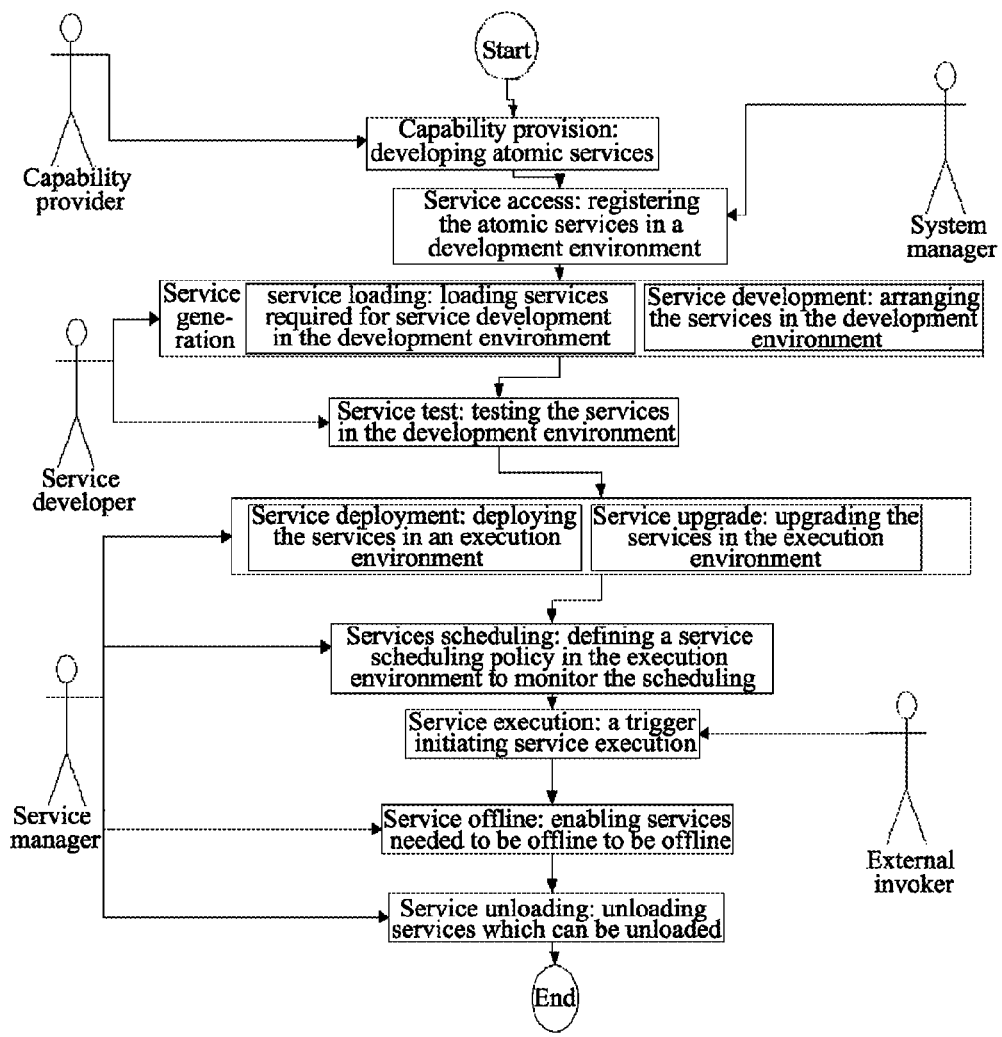
FIG. 5 is a flowchart of capability integration and opening operations of an Internet of things capability integration access platform according to an embodiment of the present document.

FIG. 5 illustrates a specific operational procedure of integration and opening in the above integration of Internet of things capabilities, which comprises the following steps 501 to 509. These steps are specifically described as follows.

In step 501, a capability provider completes development of atomic services.

In step 502, a system manager completes access and management of capability services.

In steps 503-504, a service developer completes arrangement, development and test of the capability services.

In steps 505, 506, 508 and 509, a service manager completes management of a life cycle of capability services, comprising aspects such as service deployment, service upgrade, service scheduling, service offline, service unloading etc.

In step 507, an external invoker completes triggering of capability services, and after the triggering, the services may be performed by the Internet of things capability operation management platform.

Wherein, the system manager and the service manager may be operation mangers or may also be mangers which are authorized to perform by an operator.

Figure 6:
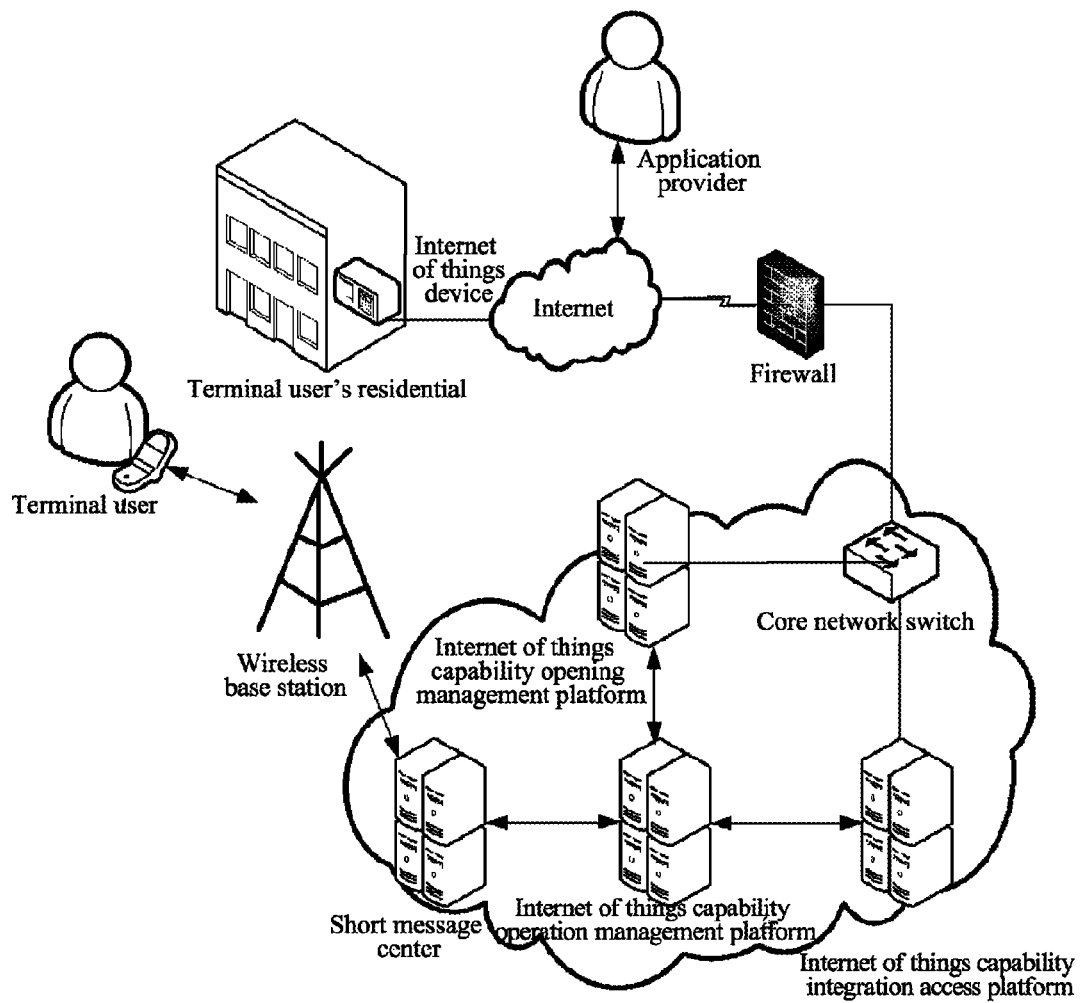
FIG. 6 is a diagram of integration of Internet of things capabilities and conventional telecommunication capabilities according to an embodiment of the present document.

FIG. 6 illustrates architecture of integration of Internet of things capabilities and conventional telecommunication capabilities according to an embodiment of the present document. Wherein, it relates to integration of conventional telecommunication short message capabilities and Internet of things capabilities. In such scenario, the Internet of things devices in a terminal user's residential access an Internet of things capability integration access management platform of an operator through the Internet, and a capability developer completes development of capabilities through the Internet of things capability development management platform, the capability services are deployed on the Internet of things capability operation management platform to complete execution of services, and the Internet of things capability operation management platform invokes the telecommunication short message capabilities to interact Internet of things services with the terminal user when the services are performed. FIG. 6 merely illustrates a diagram of integration of Internet of things capabilities and a telecommunication capability. The figure is not limited to short message capabilities, and may further comprise capabilities of all current telecommunication operations, such as multimedia messages, flow services, location services etc. In addition, the technical schemes provided by the present embodiment are not limited to the integration of the Internet of things and the telecommunication system, and may also be integration of the Internet of things and other Internets in accordance with the above schemes.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, or can also be implemented in a form of software functional module. The technical solutions are not limited to any particular form of a combination of hardware and software.

It can be seen from the above embodiments that the technical schemes of the present document integrate the Internet of things capabilities into the Internet (for example, the telecommunication operation system), which is not only applicable for a common capability of the Internet of things, but also is applicable for a private capability of the Internet of things. Two potential capability provision sources of the common capability and the private capability may be activated at the same time, so that the common capability and the private capability of the Internet of things have a channel for further development and extension, thereby broadening the development field of the Internet of things.

At the same time, the technical schemes of the present document provide a function of development of Internet of things capability services (or products) on the Internet of things capability integration access platform. This function provides an Internet of things device capability development platform to a capability provider, reduces the difficulty in capability development, enriches the execution logic of the devices, so that the Internet of things device service execution logic (or device function control logic) migrates in a direction of unified calculation and maintenance operated by the Internet of things, and further prompts the standardization of the device capability interfaces. Thus, not only low-end smart devices can be incorporated to the service execution, to reduce the requirements for device access, and further prompt and guide the development of the Internet of things devices; but also an ideal platform is created for enrichment of the Internet of things services (or products) and combination of the Internet of things capabilities and conventional Internet (for example, telecommunication) capabilities.

In addition, the technical schemes of the present document extend the Internet of things capabilities to operational services or products, so that aspects such as the management of the capability services, the management of the terminal devices, the management of terminal users, the accounting etc. are more standardized, and will also further reduce the operation cost, and on the premise that the Internet of things industrial chain is developed in a healthy way, a larger customer cluster is developed for the Internet of things services or products, which excavates a bigger market.

The technical schemes of the present document provide a function of combining the Internet of things capabilities and conventional capabilities into integrated capabilities in the provided Internet of things capability operation management platform. Thereby, the Internet of things capabilities are opened to a Service Provider/Content Provider (SP/CP) and telecommunication terminal users through the conventional Internet (for example, telecommunication) capabilities. This function flexibly incorporates the telecommunication terminal users into the Internet of things system, and further integrates the physical network services with the smart terminals etc.

The technical schemes of the present document further provide opening and management of the Internet of things capabilities. Thus, the opening of the Internet of things capabilities not only prompts the market of developing public capabilities, so that the provision, capability development and capability use of devices are further refined, but also prompts development of private capabilities and low-end capabilities, which provides a good opportunity for the cold market of private capabilities and low-end capabilities. The management of the opening of capabilities subdivides the product links in the operation sets, thereby pushing the control of capabilities to standardization and transparency.

The above description is only the preferable embodiments of the present document and it is not intended to limit the protection scope of the present document. Any modification, equivalent substitution and improvement made within the spirit and principle of the present document should be included within the protection scope of the present document.

INDUSTRIAL APPLICABILITY

The schemes sufficiently exert the operation capabilities and resources of operators, to enable them to achieve more effects and create larger values in the Internet of things industrial chain, cover the shortage of the current Internet of things industry development, and further prompt the development of the Internet of things industry.

What is claimed is:

1. An Internet of Things integration method, the method being applied in a terminal device and comprising the following steps executed by hardware that performs instructions stored in a non-transitory computer readable medium in the terminal device:

providing Internet of Things devices with access to an Internet of Things integration system;

authenticating the Internet of Things devices with the Internet of Things integration system;

developing Internet of Things services based on atomic capabilities provided by operators and the Internet of Things devices;

loading the developed Internet of Things services based on the Internet of Things devices;

performing a management operation, with the Internet of Things integration system, on the Internet of Things services which are developed and loaded while opening the Internet of Things services;

opening the Internet of Things services; and performing a management operation on the opening of the Internet of Things services;

wherein the developing Internet of Things services comprises configuring at least one of service arrangement, service testing, and service deployment;

wherein the method further comprises the following steps:

invoking telecommunication operations to interact with Internet of Things services, wherein the telecommunication operations comprise message services, flow services, and location services; and managing a life cycle related to the Internet of things services; wherein the life cycle comprises service deployment, service upgrade, service scheduling, service offline, and service unloading.

2. The method according to claim 1, wherein, the providing the Internet of Things devices with access to the Internet of Things integration system and authenticating the Internet of Things devices comprises:

identifying addresses of physical devices using gateway exchange between various network levels to complete physical layer access of the Internet of Things devices, and acquiring information of the Internet of Things devices using one or more of the following networks, and performing authentication, management, and safety functional operations on the Internet of Things devices according to the acquired information of the Internet of Things devices:

a Transmission Control Protocol/Internet Protocol (TCP/IP) core network, an Internet, a wireless communication network, and other Internets of Things with private media.

3. The method according to claim 2, wherein, the management operation performed by the Internet of Things integration system on the Internet of Things services which are developed and loaded at least comprises authentication and accounting.

4. The method according to claim 2, wherein, the management operation performed by the Internet of Things integration system on the opening of the Internet of Things services which are developed and loaded at least comprises authentication, flow control, and Service Level Agreement (SLA) control.

5. The method according to claim 1, wherein, the management operation performed by the Internet of Things integration system on the Internet of Things services which are developed and loaded at least comprises authentication and accounting.

6. The method according to claim 1, wherein, the management operation performed by the Internet of Things integration system on the opening of the Internet of Things services which are developed and loaded at least comprises authentication, flow control, and Service Level Agreement (SLA) control.

7. The method according to claim 1, wherein, the method further comprises:
providing a manager operated WEB interface to device providers, service developers, terminal users, and operator managers;
managing contents related to the Internet of Things services and the Internet of Things devices and conventional telecommunication convergent services, managing portals of the Internet of Things services and Internet of Things devices and telecommunication convergent services, managing schemes of pricing and accounting policies and preferential policies related to the Internet of Things services, and managing an ordering life cycle related to the Internet of Things services;
performing rating and accounting on the Internet of Things services after the Internet of Things services are used and ordered;
analyzing operation information and generating an operation report or a settlement statement; and
operating the Internet of Things services developed by the Internet of Things integration system and invoking the conventional telecommunication convergent services.

8. An Internet of Things integration system, comprising:
a processor, and
a non-transitory computer readable medium storing programs that, when executed by the processor, cause the processor to perform the following steps:
providing Internet of Things devices with access to the Internet of Things integration system;
authenticating the Internet of Things devices;
developing Internet of Things services based on atomic capabilities provided by operators and the Internet of Things devices;
loading the developed Internet of Things services based on the Internet of Things devices;
performing a management operation on the Internet of Things services which are developed and loaded while opening the Internet of Things services; and
performing a management operation on the opening of the Internet of Things services;
wherein the developing Internet of Things services comprises configuring at least one of service arrangement, service testing, and service deployment;
wherein the programs further cause the processor to perform the following steps:

invoking telecommunication operations to interact with Internet of Things services, wherein the telecommunication operations comprise message services, flow services, and location services; and
managing a life cycle related to Internet of things services; wherein the life cycle comprises service deployment, service upgrade, service scheduling, service offline, and service unloading.

9. The Internet of Things integration system according to claim 8, wherein, the providing the Internet of Things devices with access to the Internet of Things integration system, and authenticating the Internet of Things devices comprises:
identifying addresses of physical devices using gateway exchange between various network levels to complete physical layer access of the Internet of Things devices, and acquiring information of the Internet of Things devices using one or more of the following networks, and performing authentication, management, and safety functional operations on the Internet of Things devices according to the acquired information of the Internet of Things devices:
a Transmission Control Protocol/Internet Protocol (TCP/IP) core network, an Internet, a wireless communication network, and other Internets of Things with private media.

10. The Internet of Things integration system according to claim 8, wherein,
the management operation performed by the Internet of Things integration system on the Internet of Things services which are developed and loaded at least comprises authentication and accounting.

11. The Internet of Things integration system according to claim 8, wherein,
the management operation performed by the Internet of Things integration system on the opening of the Internet of Things services which are developed and loaded at least comprises authentication, flow control, and Service Level Agreement (SLA) control.

12. The Internet of Things integration system according to claim 8, wherein the programs further cause the processor to perform the following steps:
providing a manager operated WEB interface to device providers, service developers, terminal users, and operator managers;
managing contents related to the Internet of Things services and the Internet of Things devices and conventional telecommunication convergent services, managing portals of the Internet of Things services and Internet of Things devices and telecommunication convergent services, managing schemes of pricing and accounting policies and preferential policies related to the Internet of Things services, and managing an ordering life cycle related to the Internet of Things services;
performing rating and accounting on the Internet of Things services after the Internet of Things services are used and ordered;
analyzing operation information and generating an operation report or a settlement statement; and
operating the Internet of Things services developed by the Internet of Things integration system and invoking the conventional telecommunication convergent services.

* * * * *